(12) United States Patent
Hasson et al.

(10) Patent No.: US 11,941,463 B1
(45) Date of Patent: Mar. 26, 2024

(54) CENTRALIZED RATE LIMITER

(71) Applicant: monday.com Ltd., Tel Aviv (IL)

(72) Inventors: Noam Hasson, Netanya (IL); Omer Doron, Tel Aviv (IL); Eviathar Moussaffi, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 18/091,451

(22) Filed: Dec. 30, 2022

(51) Int. Cl.
*G06F 9/46* (2006.01)
*G06F 9/54* (2006.01)

(52) U.S. Cl.
CPC .............. *G06F 9/546* (2013.01); *G06F 9/542* (2013.01)

(58) Field of Classification Search
CPC ................................ G06F 9/546; G06F 9/542
See application file for complete search history.

(56) References Cited

U.S. PATENT DOCUMENTS

| | | | |
|---|---|---|---|
| 9,098,341 B2 * | 8/2015 | Manikowski | G06F 9/505 |
| 2015/0149610 A1 * | 5/2015 | Jhanb | H04L 63/1408 |
| | | | 709/224 |

* cited by examiner

*Primary Examiner* — Diem K Cao

(57) ABSTRACT

There is provided method of centralized control of event messages for accessing services by processes that generate event messages, comprising: monitoring event messages from an event broker server of a distributed event streaming technology service monitoring a central event dataset storing the event messages streamed over a network from the processes for accessing the services, counting a number of event messages for combination(s) of event attribute(s) according to set(s)-of-rules, dynamically generating a lock that includes instructions for blocking the event messages having the certain combination of event attributes(s) in response to the number reaching a threshold for a certain combination of event attribute(s), and dynamically providing the lock to each process that generates event messages having the combination of event attribute(s), wherein each process is configured for implementing the lock for locally blocking the event messages having the certain combination of event attribute(s).

19 Claims, 3 Drawing Sheets

CENTRALIZED RATE LIMITER

FIELD AND BACKGROUND OF THE INVENTION

The present invention, in some embodiments thereof, relates to rate limiting and, more specifically, but not exclusively, to a centralized rate limiter.

In computer networks, rate limiting is used to control the rate of requests sent from applications running on client terminals to services hosted by servers. When thousands of users share a service, rate limiting helps the system to be available for all its clients. Rate limiting also protects a system from denial of service attacks (DoS).

A standard approach for controlling access to APIs of services by processes is by using a centralized API rate limiter. All request messages flow through the API rate limiter to the APIs. The API rate limiter first checks the request messages and then lets the request messages pass through. Another example of another standard approach for controlling access is placing the API rate limiter within the internal memory of each server. Requests to the service hosted on each server are forwarded via the rate limiter executed by that server. The standard API rate limiters may identify anomalous activity such as a very high request rate, and quickly block it.

SUMMARY OF THE INVENTION

According to a first aspect, a computer implemented method of centralized control of event messages for accessing a plurality of services by a plurality of processes that generate a plurality of event messages, comprises: monitoring event messages from an event broker server of a distributed event streaming technology service monitoring a central event dataset storing the plurality of event messages streamed over a network from the plurality of processes for accessing the plurality of services, counting a number of event messages for at least one combination of at least one event attribute according to at least one set-of-rules, dynamically generating a lock that includes instructions for blocking the event messages having the certain combination of at least one event attributes in response to the number reaching a threshold for a certain combination of at least one event attribute, and dynamically providing the lock to each process that generates event messages having the combination of at least one event attribute, wherein each process is configured for implementing the lock for locally blocking the event messages having the certain combination of at least one event attributes.

According to a second aspect, a system for centralized control of event messages accessing a plurality of services by a plurality of processes that generate a plurality of event messages, comprises: at least one processor executing a code for: monitoring event messages from an event broker server of a distributed event streaming technology service monitoring a central event dataset storing the plurality of event messages streamed over a network from the plurality of processes for accessing the plurality of services, counting a number of event messages for at least one combination of at least one event attribute, and dynamically generating a lock that includes instructions for locally blocking the event messages having the certain combination of at least one event attributes in response to the number reaching a threshold for a certain combination of at least one event attribute.

According to a third aspect, a computer implemented method of centralized control of event messages for accessing a plurality of services by a plurality of processes that generate a plurality of event messages, comprises: monitoring event messages from an event broker server of a distributed event streaming technology service monitoring a central event dataset storing the plurality of event messages streamed over a network from the plurality of processes for accessing the plurality of services, counting a number of event messages for at least one combination of at least one event attribute, dynamically generating a lock that includes instructions for blocking the event messages having the certain combination of at least one event attributes in response to the number reaching a threshold for a certain combination of at least one event attribute, and dynamically providing the lock to at least one locker-gate process that is positioned between the plurality of processes and the plurality of services, for local blocking of the event messages having the combination of at least one event attribute.

In a further implementation form of the first, second, and third aspects, an event message that is blocked by the lock sends an event message to the event broker server.

In a further implementation form of the first, second, and third aspects, the event messages streamed over the network from the plurality of processes to the plurality of services are non-gated by a central rate limiting application.

In a further implementation form of the first, second, and third aspects, the lock is generated for blocking event messages from any one of the plurality of processes that generate event messages.

In a further implementation form of the first, second, and third aspects, the lock is generated according to a set-of-rules, wherein a certain set-of-rules is selected from a plurality of sets-of-rules according to the certain combination of at least one event attribute.

In a further implementation form of the first, second, and third aspects, the plurality of sets-of-rules are provided by a user and are updatable, wherein each of the plurality of sets-of-rules is customizable.

In a further implementation form of the first, second, and third aspects, the number of event messages counted for each process is an event attribute, wherein the lock includes instructions for locally blocking the event messages according to the event attribute and the certain combination of at least one event attribute.

In a further implementation form of the first, second, and third aspects, the plurality of event messages are generated in response to a plurality of request messages generated by the plurality of processes for accessing the plurality of services, wherein the plurality of event message are distinct from the plurality of request messages, wherein the plurality of request messages are streamed over the network from the plurality of processes to the plurality of services, the plurality of request messages are non-gated by a central rate limiting application, wherein the lock includes instructions for locally blocking streaming of the request messages.

In a further implementation form of the first, second, and third aspects, further comprising synchronizing between a plurality of locks implemented by at least one of a plurality of processes that generate the event messages having the combination of at least one event attribute, and a plurality of client terminals running the plurality of processes.

In a further implementation form of the first, second, and third aspects, the at least one of: each process and each client terminal, is configured to send an event message to the event broker server indicating whether the lock is successfully implemented.

In a further implementation form of the first, second, and third aspects, further comprising a plurality of counters each with a corresponding threshold, each counter for counting the number of the event messages of a certain combination of at least one event attribute, wherein a certain lock corresponding to a certain counter is dynamically generated when the number counted by the certain counter reaches a certain corresponding threshold.

In a further implementation form of the first, second, and third aspects, further comprising analyzing the plurality of event messages to identify a plurality of combinations of at least one event attributes, and automatically generating the plurality of counters for counting event messages according to the plurality of combinations of at least one event attributes.

In a further implementation form of the first, second, and third aspects, further comprising computing a future time at which the threshold is predicted to be reached, and wherein the lock includes instructions for implementing the blocking at the future time.

In a further implementation form of the first, second, and third aspects, further comprising feeding the plurality of event messages having the combination of at least one attribute into the ML model, wherein the ML model is trained on a training dataset comprising a plurality of records, wherein a record includes a plurality of event messages having the combination of at least one attribute, and a ground truth indicating of whether the lock is to be provided or not.

In a further implementation form of the first, second, and third aspects, the event dataset stores a historical record of event messages, and wherein the historical record is fed into the ML model.

In a further implementation form of the first, second, and third aspects, further comprising computing a percentage of the event messages with combination of at least one event attribute of the stream of the plurality of event messages, and dynamically generating the lock in response to the percentage reaching a percentage threshold.

In a further implementation form of the first, second, and third aspects, the at least one event attribute is selected from a group comprising: source process that generated the event message, target service destination for the event message, geographical location of the source process that generated the event message, geographical location of the target service for the event messages, time of generation of the event message, user using the process that generated the event message, micro service, event type, and combination thereof.

In a further implementation form of the first, second, and third aspects, the lock includes a timeframe for implementing the lock.

In a further implementation form of the first, second, and third aspects, at least one of: wherein the plurality of processes comprise a plurality of applications, wherein the plurality of processes are executed by a plurality of client terminals, wherein the plurality of applications are accessed via a plurality of virtual interfaces, wherein the plurality of virtual interfaces are implemented as application programming interfaces (APIs), wherein the plurality of services hosted by at least one server, wherein the plurality of client terminals are in network communication with the at least one server.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE SPECIFIC EMBODIMENTS OF THE INVENTION

Figure 1:
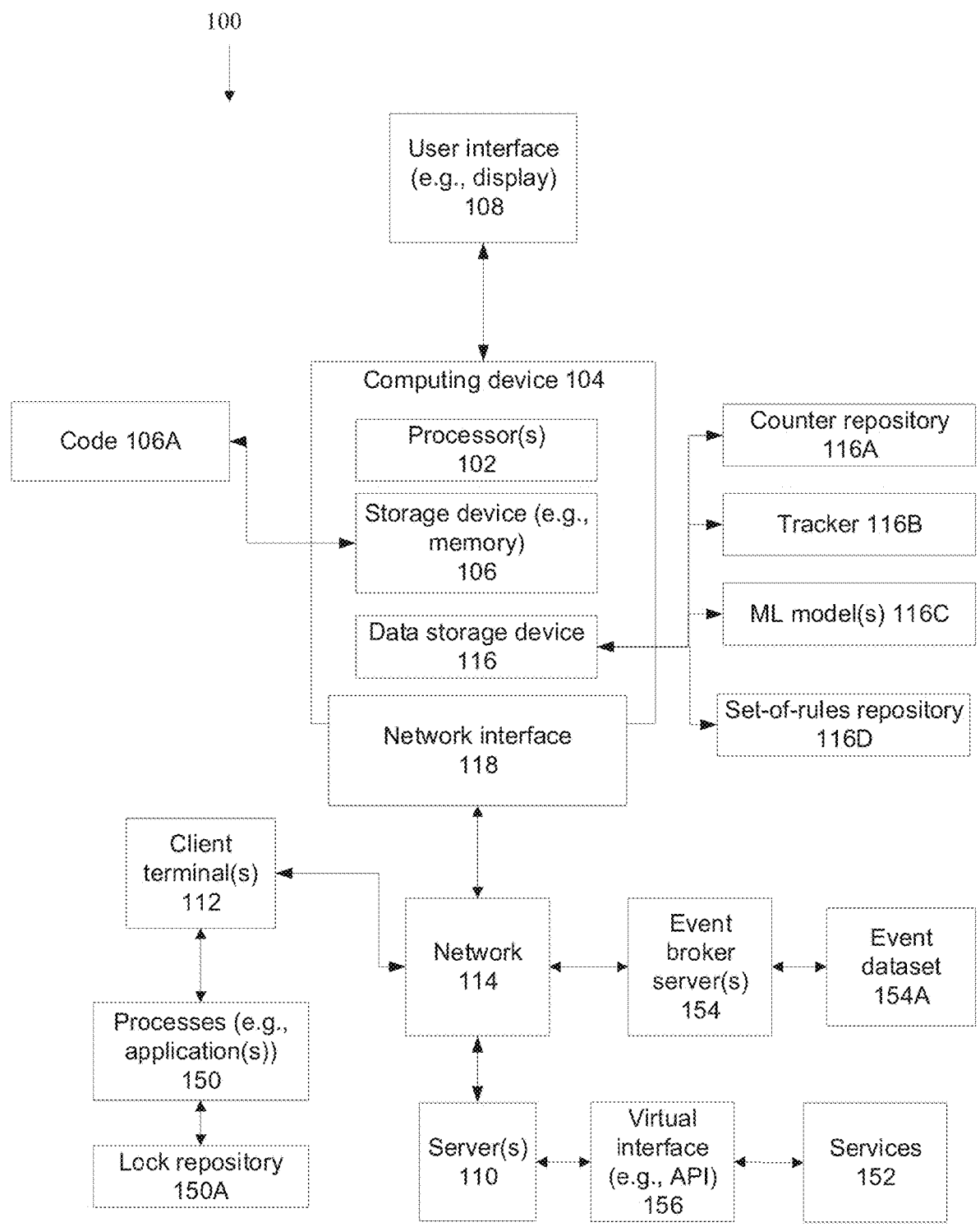
FIG. 1 is a block diagram of components of a system for centralized control of event messages for accessing multiple services, in accordance with some embodiments of the present invention.

The present invention, in some embodiments thereof, relates to rate limiting and, more specifically, but not exclusively, to a centralized rate limiter.

An aspect of some embodiments of the present invention relates to systems, methods, computing devices, and/or code instructions (stored on a data storage device and executable by one or more processors) for centralized control of event messages for accessing services by processes (e.g., applications) that generate event messages by dynamically generated locks. A processor(s) (e.g., of a server) monitors (e.g., obtains an indication of) event messages from an event broker server of a distributed event streaming technology service (e.g., KAFKA®). The event broker server monitors a central event dataset storing event messages streamed over a network from the processes (e.g., applications, optionally running on client terminals) for accessing the services (e.g., hosted on servers). The event messages may be streamed over the network from the processes to the services may be non-gated by a central rate limiting application. The processor(s) counts a number of event messages for one or more combinations of one or more event attributes, for example, source process that generated the event message, target service destination for the event message, geographical location of the source process that generated the event message, geographical location of the target service for the event messages, time of generation of the event message, user using the process that generated the event message, micro service, event type. In response to the number of event messages of the certain combination of event attributes reaching a threshold, the processor(s) dynamically generates a lock that includes instructions for blocking the event messages having the certain combination of event attributes. The lock may be generated according to a set-of-rules, which may be provided by a user, customizable, and/or updatable. The lock may be provided to each process that generates the event messages having the certain combination of event attributes, for localized blocking at the process level. In such embodiments each process is configured for implementing the lock for locally blocking the event messages having the certain combination of event attributes. Alternatively or additionally, the lock is dynamically provided to one or more locker-gate processes that are positioned between the processes that generate the event messages and the services, for local blocking of the event messages having the combination of events by the locker-grate process.

At least some embodiments described herein address the technical problem of controlling access to services by multiple processes. At least some implementations described herein improve the technical field of controlling access to services by multiple processes. At least some implementations described herein improve over prior approaches of controlling access to services by multiple processes.

Multiple processes, for example, application, which may run on different client terminals, may access multiple services hosted by one or more servers via virtual interfaces (e.g., application programming interfaces (APIs)). For example, thousands of users may share the same service. Excessive requests to access the virtual interface(s) may block other requests from accessing the virtual interface(s), and/or bring down the server(s) hosting the virtual interface(s). Controlling access may help to ensure that the service is available to the requesting processes, and/or that the service is fairly accessed by the requesting processes.

At least some embodiments described herein address the aforementioned technical problem, and/or improve the aforementioned technical field, and/or improve upon the aforementioned prior approaches, by monitoring a central event dataset storing event messages, analyzing the event messages having one or more event attributes using a set-of-rules, and generating a lock when the set-of-rules is met. The lock may be implemented by the process(es) that generate the event messages with the event attributes(s), for locally blocking the event messages with event attribute(s).

At least some embodiments described herein address the aforementioned technical problem, and/or improve the aforementioned technical field, and/or improve upon the aforementioned prior approaches, by providing a centralized, cross service, generic, rate-limiting solution, where monitoring of event messages, and analyzing the event messages, enables generating specific locks to limit specific types of events with specific event attribute(s).

In at least some embodiments described herein, a standard rate limiter is not implemented. Moreover, the event message are distinct from the lock instructions. This allows the event messages to flow from the processes to the virtual interfaces, without flowing through the standard rate limiter and/or without flowing through the lock, which may delay the rate in which events flow when the standard rate limier is overloaded. In other embodiments, the event messages are distinct from data message that flow from the processes to the virtual interfaces. The event messages may be generated in response to generation of the data messages. This allows processing the event messages as an indication of the state of the data message without intercepting the data messages. The instructions for generating the lock are external to the processes and/or external to the services. The lock itself may be implemented at the process level, by the processes that generate and/or trigger the event messages. The generated lock includes instructions for locally blocks event messages at the level of the process and/or client terminal, rather than providing blocking by the standard rate limiter centrally and/or at the server level. Events that should be blocked are not handled by a rate limiter. The events that are to be blocked (according to the lock) may be handled at the process level by the process implementing the lock. The event messages that are locally blocked at the process level by the lock do not overflow a rate limiter through which event messages may flow and/or do not hinder other event messages generate by other processes that are waiting for approval to be sent. This allows for specific locking of specific event messages, rather than blocking a broader range of event messages which should not be blocked. The lock may include instructions for blocking the event messages at a future time, which may be pre-defined and/or based on a prediction of when the set-of-rules will be met.

The set-of-rules which are used to define the lock analyze the messages in the event dataset. This enables adding, changing, and/or removing sets-of-rules without impacting operation of the processes and/or services, and/or without requiring modification of code of the processes and/or services. The set-of-rules may be provided by users, enabling control over generation of locks, for example, according to specific combinations of event attributes. The user may easily update the set-of-rules, for example, adapt existing sets-of-rules, cancel sets-of-rules, and/or add new sets-of-rules.

The set-of-rules may be a percentage such as a percentage of activity, for example, a percentage of event messages with event attribute(s) of other event messages with other event attribute(s). The central monitoring of the event dataset that includes the event message enables computation of the percentage. Other standard implementations of rate limiters do not enable computing percentages, since data regarding all event messages is not necessarily available.

Multiple sets-of-rules may be defined, which provides for granularity. The granularity may be according to the event attribute of the event messages, as defined by each set-of-rules. The multiple sets-of-rules provide high resolution of the locks, and/or enables precise definitions of the lock.

The event dataset that includes the event messages may store a history of event messages, which allows for the set-of-rules to be based on the history of the event message. This history of the event messages allows, for example, predicting future times when the set-of-rules will be met, and/or detecting when the set-of-rules is met based on a historical pattern of the event messages.

At least some embodiments described herein are designed to address the problem of recurrent incidents, which may lead to downtime of services. The services may be highly coupled, making it difficult to create a separation between the services. Most downtime may be due to a single component and/or entity. At least some embodiments described herein enable blocking messages from the single component and/or entity and/or to a single service, while allowing other components and/or entities and/or services to continue operating.

At least some embodiments described herein may protect services from edge cases and/or human errors. The edge cases and/or human errors may generate event messages that cause downtime of services. New edge cases may trigger old code which may cause downtime of services. It may be hard to anticipate and/or test for edge cases to prevent downtime of services. R&D growth causes more code, which may cause more bugs, leading to more downtime of services. Moreover, coding standard and/or testing quality may vary between teams, making it more difficult to detect code that may cause downtime of services. Even small incidents may create additional traffic over a network, which may cause congestion and/or increased latency, indirectly leading to downtime of services. At least some embodiments described herein provide a generic safety net, that may identify the edge cases and/or human errors leading to services downtime, and automatically generate locks to block event message from the edge cases and/or human errors for preventing and/or reducing the services downtime.

At least some embodiments described herein automatically generate locks that may protect specific services from downtime due to excessive messages. The lock may isolate and block specific executions, for example, process, entity, service, account, and the like. The lock may be automatically generated for a specific incident, for containing the incident and preventing the incident from spreading across a system. A small incident may be prevented from eventually shutting down the system.

At least some embodiments described herein improve upon centralized rate limiting, by providing a lock that limits specific executions (e.g., process, entity, service, and the like) and/or event messages with defined event attributes. The lock may provide dynamic locking, for example, for multiple time windows.

At least some embodiments described herein may provide cross service balance, where the set-of-rules are applied for multiple services.

At least some embodiments described herein provide minimal performance impact on the services, for example, by executing the set-of-rules and/or lock on processors that are different from the processors executing the services. The lock described herein is designed for specific blocking, which won't cause downtime to other services and/or other processes. Different sets-of-rules may be defined without requiring deployment.

At least some embodiments described herein improve performance of the executing processes and/or the executing services. For example, evaluation of the set-of-rules has not impact on latency of the messages travelling from the processes to the services, streaming the event messages to the event dataset has low overhead (e.g., event messages may be sent in the background). The locks are dynamically created (e.g., on the fly) without necessarily requiring advanced planning of the locks, and/or without necessarily requiring code deployment.

At least some embodiments described herein improve a user experience in managing access of services by processes. For example, a centralized mission control (e.g., via a graphical user interface) may provide statistics, enable creation of sets-of-rules, and/or enable rebalancing in real time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
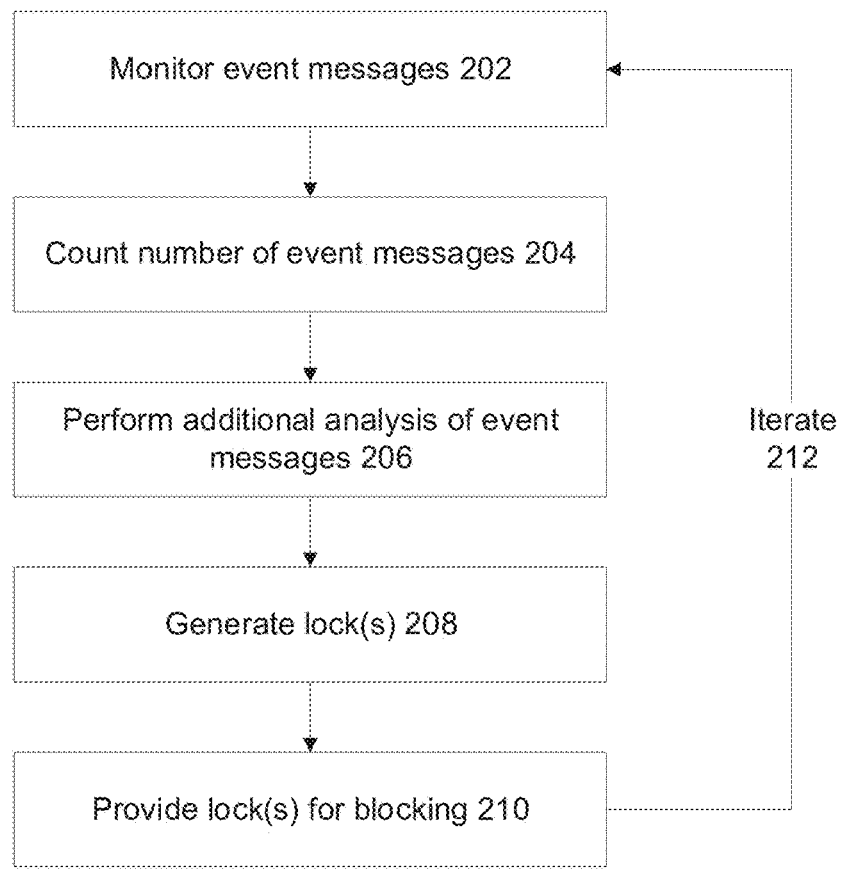
FIG. 2 is a flowchart of a method of centralized control of event messages for accessing multiple services, in accordance with some embodiments of the present invention.
Figure 3:
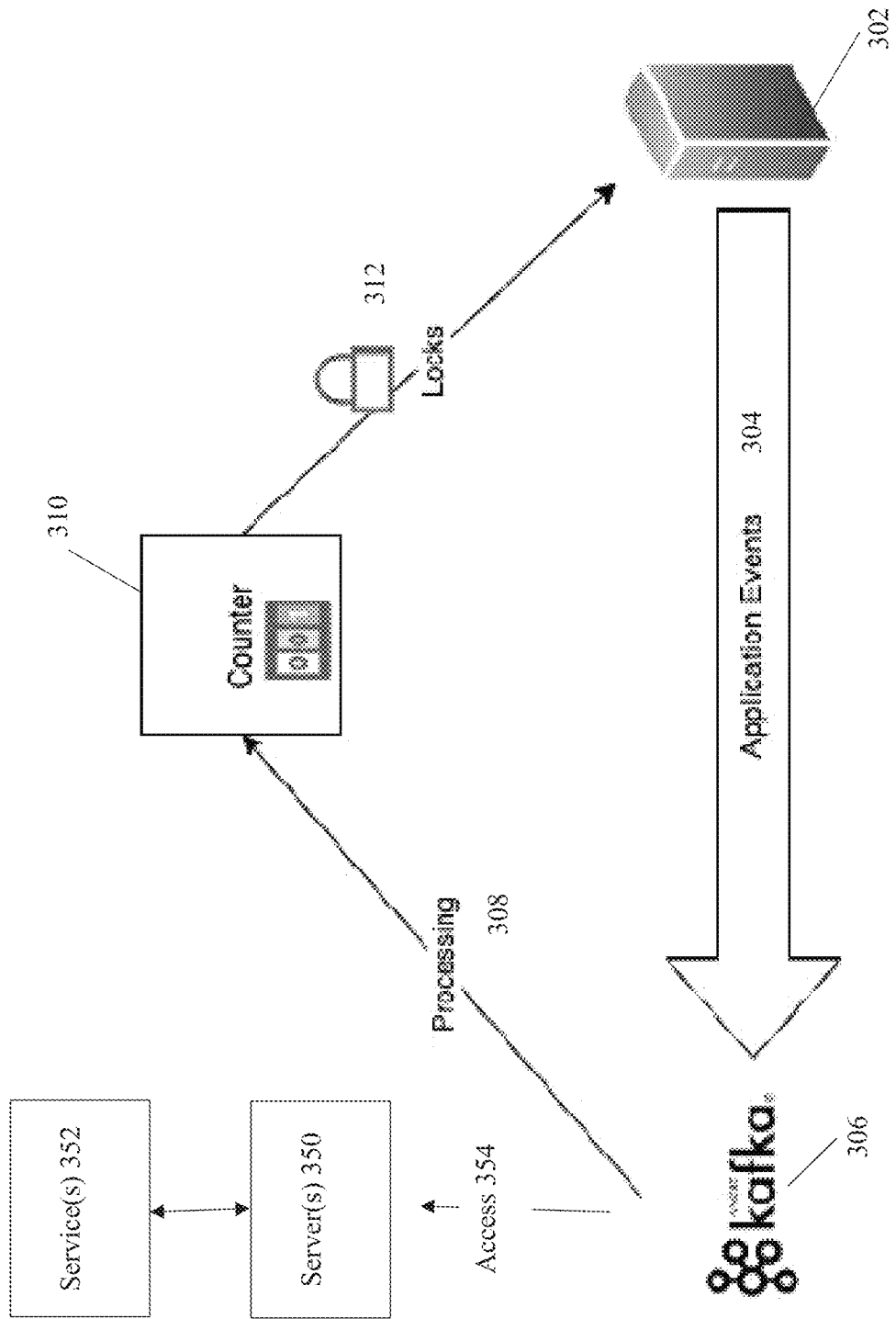
FIG. 3 is a schematic depicting exemplary dataflow for centralized control of event messages for accessing multiple services, in accordance with some embodiments of the present invention.

Reference is now made to FIG. 1, which is a block diagram of components of a system 100 for centralized control of event messages for accessing multiple services, in accordance with some embodiments of the present invention. Reference is also made to FIG. 2, which is a flowchart of a method of centralized control of event messages for accessing multiple services, in accordance with some embodiments of the present invention. Reference is also made to FIG. 3, which is a schematic depicting exemplary dataflow for centralized control of event messages for accessing multiple services, in accordance with some embodiments of the present invention.

System 100 may implement the acts of the method described with reference to FIGS. 2-3 by processor(s) 102 of a computing device 104 executing code instructions 106A stored in a data storage device 106 (also referred to as a memory and/or program store).

Computing device 104 may referred to as, for example, a central rate limiter application and/or a central locker.

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing device 104 may be executed as code running on an event broker server(s) 154, which hosts event dataset 154A.

Event broker server(s) 154 is of a distributed event streaming technology service, for example, Kafka®. Event broker server(s) 154 hosts and/or manages an event dataset 154A, which stores event messages generated by multiple processes (e.g., applications) 150, optionally running on client terminal(s) 112. Event messages may be stored in records of event dataset 154A, for example, according to respective event attributes and/or combinations of event attributes, as described herein.

Processes (e.g., applications) 150 may be running on one or more client terminals 112. Processes 150 attempt to access services 152 which may be running on one or more server(s) 110, optionally via virtual interfaces 156 (e.g., application programming interface (API), software development kit (SDK), and the like). Processes 150 may implement dynamically generated locks and/or predefined locks that may be stored in a lock repository 150A.

Processes 150 generate event messages for accessing services 152, and/or in response to request messages for accessing services 152. Processes 150 stream across a network 114, and are stored in event dataset 154A.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 2-3 when executed by processor(s) 102.

Computing device 104 is in network communication with event broker server(s) 154 over network 114. Computing device 104 monitors (e.g., obtains an indication of) event messages stored in event dataset 154A, for example, number of events with a certain event attribute that reached event dataset 154A within a defined time window (e.g., rate of events).

Computing device 104 may include a data storage device 116 for storing data, for example one or more of: counter repository 116A that includes dynamically generated counters and/or predefined counters, where counters may be included in sets-or-rules, tracker 116B (e.g., another set-of-rules) for tracking which lock instructions were sent to which process 150 and/or for tracking instructions sent to elongate sent locks, ML model(s) 116C (and/or other approaches) such as for predicting a future time for activating and/or termination of the locks, and/or set-of-rules repository 116D which stores one or more sets-of-rules for automatic generation of locks (e.g., user entered, per combination of event attributes, and/or automatically generated), as described herein. Data storage device 116 may be implemented as, for example, a memory, a local hard-drive, virtual storage, a removable storage unit, an optical disk, and/or a storage device.

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 may connect using network 114 (or another communication channel, such as through a direct link (e.g., cable, wireless) and/or indirect link (e.g., via an intermediary computing unit such as a server, and/or via a storage device) with client terminals(s) 112 running processes 150 and/or server(s) 110 running services 152 and/or event broker server(s) 154 hosting event dataset(s) 154A, as described herein.

Computing device 104 include and/or is in communication with one or more physical user interfaces 108 that include a mechanism for a user to enter data and/or view data (e.g., view rules, view lock, view state of lock)). Exemplary user interfaces 108 include, for example, one or more of, a touchscreen, a display, a keyboard, a mouse, and voice activated software using speakers and microphone.

Referring now back to FIG. 2, at 202, a processor (e.g., of computing device 104) monitors (e.g., obtains an indication of) event messages, from an event broker server of a distributed event streaming technology service.

The event broker server monitors a central event dataset storing event messages streamed over a network from processes, for accessing services. The processes may be applications, for example, a web browser, a database, a social network and the like. The processes may be running on one or more client terminals. The services may be, for example, a web site, an online database, and a social network hosting social profiles of users. The services may be hosted by one or more servers. The services may be accessed by the processes via respective virtual interfaces, for example, APIs, SDKs, and the like.

In some cases, the event messages that are streamed over the network from the processes to the services are non-gated and/or do not pass through an approving authority that approves or does not approve direct communication from the processes (e.g., client terminals) to the services. For example, there is no central rate limiting application that acts as a gate on a transmission path between the processes (e.g., client terminals) and the services (e.g., virtual interfaces for accessing the services hosted on servers) that controls the rate of messages reaching the services (e.g., virtual interfaces).

The event messages may be stored in topics hosted by the event dataset. Each topic may include event messages with a certain event attribute or combination of multiple event attributes. The event dataset may store a history of event messages, for example, within a defined time window, where event messages older than the time window are purged and/or ignored. The historical event messages may enable, for example, identifying different combinations of event attributes for generation of different locks, training a machine learning model, inference by a machine learning model, and the like.

The messages may be generated by respective processes, and/or by client terminals on which the processes are running.

Optionally, the event messages are used for accessing the services. For example, the event messages are streamed from the processes (and/or client terminals) to the event dataset hosted by the event broker server. The services (e.g., APIs or other virtual interfaces) may access the events from the event dataset, and/or the events from the event dataset are streamed to the services.

Alternatively, the event messages are generated in response to request messages generated by the processes for accessing the services. The event message are distinct from the request messages. In such implementation, each event message corresponds to a certain request message for accessing the service(s). The event message provides an indication (e.g., record) of the request message, to help track and/or monitor and/or analyze the request message. The request messages are streamed over the network from the processes to the services, without being gated by a central rate limiting application (i.e., the request messages are non-gated). The generated lock (as described herein) includes instructions for locally blocking streaming of the request messages.

Each event message may include one or more event attributes, for example, as fields and/or values. Event message may be schemeless that include different fields and/or values, or defined by a schema with predefined fields and/or values. Event message may include human readable text, and/or machine readable code.

Event messages may be generated automatically (e.g., out of the box events for: HTTP requests, database, Redis, and the like).

Events messages may be used for defining the set-of-rules, as described herein, but are not necessarily design driven by the set-of-rules.

A process may generate on the order of thousands of event message per second for a service (e.g., server).

Examples of event attributes include: indication of a source process (e.g., unique ID, name, network address) that generated the event message, target service destination (e.g., unique ID, name, network address) for the event message, geographical location of the source process that generated the event message, geographical location of the target service for the event messages, time of generation of the event message, user (e.g., user credentials, unique ID) using the process that generated the event message, micro service (e.g., that generated the message), event type, and combination thereof.

An exemplary event message is described as follows. The exemplary event message includes the following event attributes, followed by specific values assigned to the event attributes. The event attributes and assigned values enable generating counters, sets-of-rules, and locks for locking event messages with a specific combination of event attributes, as described herein.

As used herein, the term event attribute may refer to specific values assigned to the event attribute. For example, a lock may be generated for locking event messages with the event attribute "account_id", for all account ids, or for specific values of the account_id such as 42.

```
{
  "domain": "workflows,"
  "app": "column-values,"
  "path": "/board/items/list,"
  "type": "API REQUEST,"
  "account_id": 42,
  "user_id": 232352,
  "board_id": 683,
  "timestamp": 1653389320,
  "account_type": "enterprise"
}
```

At 204, the processor counts the monitored event messages (e.g., according to the indication) obtained from the event broker server.

The processor may count event messages per combination of one or more event attributes. The counting may be performed by a counter processor. Optionally, there are multiple counters, where each counter counts the event messages having a specific combination of one or more event attributes.

The counter may count event messages of a certain combination of event attributes, regardless of the source of the event messages. Event messages with the same certain combination of event attributes originating from different processes and/or from different client terminals may be counted by the same counter, to obtain an overall number of the event messages. When counting according to specific source processes and/or source client terminals is desired, the combination of event attributes may include the source process(es) and/or source client terminal(s) as event attributes, such that the counter counts the event messages with event attributes that include the source.

The counter used to count the event messages may be dynamically generated, optionally according to an analysis of historical records of event messages. The analysis may be performed to identify different combination of one or more event attributes. For example, the processor may cluster historical event messages according to event attributes. Each cluster represents a certain combination of one or more event attributes. Counters may be automatically generated according to the combinations, where each counter counts event messages satisfying a certain combination of event attributes.

Alternatively or additionally, the event broker server(s) may run a counter application that counts the event messages in the event dataset. In such implementation the counted number may be provided to the processor (e.g., running on the computing device described herein), which may evaluation the set-of-rules using the counted number and/or dynamically generated the lock(s) according to the counted number, as described herein.

The counter may be part of a set-of-rules, which may further define the threshold that triggers generation of the lock, as described herein.

An exemplary rule is now described. The example is of a simple rule that finds application events that have the same values as under "observe". Note the wildcard value. For each "account_id", a separate counter may be automatically created. The counter counts events from the last 5 minutes, as defined by the field "time_window_seconds":300. The counter triggers a lock when reaching 1000 event messages.

```
{
  "observe": {
    "domain": "workflows",
    "app": "column-values",
    "path": "/board/items/*",
  }
  "counter": {
    "group by": ["account_id"],
    "time_window_seconds": 300,
    "events lock trigger": 1000
  }
}
```

An exemplary counter state is now described. The counter state may be internal. The counter may be based on rules. Counters may be cross processes (e.g., applications), for counting event messages originating from different processes. Counters may count for defined time windows. The example below, the counter count events occur over a 5 minute interval (i.e. 1653391187−1653390887=300 seconds). Counters may be arranged in groups. Each counter group may include multiple counters, optionally a large number of counters, such as on the order of thousands, tens of thousands, hundreds of thousands, millions, or more. In the example below, there is a counter based on the rule "workflow-board-list-limit". There may be a large number of counters (e.g., millions), for example, one for each account-id. The current balance for account-id is 1000. This will trigger an automatically generated lock.

```
{
  "rule_name": "workflow-board-list-limit",
  "observe": {
    "account_id": 5,
  }
  "current": {
    "events": 1000,
    "time_window_start": 1653390887,
    "time_window_end": 1653391187
  }
  "all_time": {
    "events": 13452343,
  }
}
```

At 206, the processor may perform additional analysis. The additional analysis may be performed using the counted number.

Optionally, a percentage of event messages with a certain combination of event attribute(s) from the stream of event messages, for example originating from two or more different processes, is computed. The percentage is computed as the number of event message with the combination of event attribute(s) of event messages originating from different processes divided by the number of event messages with other event attributes, for example, total number of event messages with the event attribute(s) originating from all processes, total number of event messages with all event attributes that originated from the two or more processes, and the like. The central monitoring of event message enables computing percentages, which cannot be done or is difficult to compute, using standard approaches.

Optionally, the processor computes a future time at which the threshold is predicted to be reached. The predicted future time may be computed based on an analysis of historical event messages. Optionally, the predicted future time is obtained by feeding the event messages with combination of event attributes(s), optionally a history of multiple event messages obtained over a time interval, into a time prediction machine learning model. The time prediction ML model may be trained on a training dataset of multiple records, where each record includes history of one or more event messages with combination of event attribute(s) and a ground truth indicating when the threshold was met.

Alternatively or additionally, the processor determines whether a set-of-rules is met. The set-of-rules may include the threshold of the counted number of event messages of the combination of event attribute(s), and/or other rules, such as a size of a time window of when the counting is done, where the counter may be reset when the time window is exceeded. The processor may feed the event messages with combination of event attributes(s), optionally a history of multiple event messages obtained over a time interval, into a rule ML model. The rule ML model may be trained on a training dataset of multiple records, where each record includes history of one or more event messages with combination of event attribute(s) and a ground truth indicating whether the set-of-rules is met or not.

At 208, the processor dynamically generates a lock.

The lock may be dynamically generated in response to the number of the event messages with the combination of event attributes reaching (e.g., matching and/or exceeding) a threshold.

The threshold may be predefined, for example, by the set-of-rules associated with the counter. The threshold may be dynamically computed, for example, by an ML model, based on an analysis of historical event messages, and the like.

The lock includes instructions for locally blocking the event messages having the certain combination of event attributes. The event message may be blocked from being streamed, prevented from being generated, discarded, and/or locally stored and prevented from existing the client terminal. The local blocking of the event messages with the certain combination of event attributes may be done, for example, by each process that generates the event message with the certain combination of event attributes and/or by each client terminal that runs the process that generates the event message with the certain combination of event attributes.

When multiple different processes and/or multiple different client terminals generate event messages with the certain combination of event attributes, multiple locks may be generated, where each lock is for local implementation by a respective process and/or respective lock.

The lock may be generated for blocking event messages from any one of the processes that generate event messages.

Multiple locks may be generated, where each lock is for a certain combination of event attributes whose counted exceeded the threshold defined for the certain combination.

The lock may be dynamically generated by a set-of-rules. A certain set-of-rules for generating the lock may be selected from multiple sets-of-rules according to the certain combination of event attribute(s). For example, the event attribute(s) of event messages are determined. The set-of-rules that corresponds to the event attribute(s) of the event messages may be selected. For example, a mapping dataset maps between combinations of event attributes and sets-of-rules, and/or a search is performed on metadata of the sets-of-rules indicating event attributes of the sets-of-rules using the event attributes of the event messages.

The set-of-rules may define the combination of event attributes and threshold. The counter may be defined by the set-of-rules. When the counter number reaches the threshold, the set-of-rules may trigger generation of the lock.

The sets-of-rules may be provided by a user, for example, via a user interface of a client terminal. The set-of-rules may be updatable and/or customizable. A single set-of-rules may be applied to multiple (e.g., a large number, potentially infinite number) different services and/or processes, instead of separately implementing sets-of-rules for each individual service and/or process.

Optionally, the generated lock includes a timeframe during which the lock is implemented, for example, 5 minutes at the start of every hour, one time 1 hour at a certain date, every day for 10 minutes, and the like. a timer that instructs termination of the blocking when a predefined time is reached and/or elapsed. When the predefined time elapses, the event messages with the combination of event attributes may be regenerated and/or streamed by the process and/or client terminal. The predefined time may be computed based on an analysis of historical records, for example, by the timer ML model described herein. The predefined time may be selected as a fixed amount of time. The predefined time enables the event messages with the combination of event attributes to resume streaming.

The number of event messages counted for each process may be considered as an event attribute, for example, when evaluating whether the set-of-rules is met by a combination of event attributes. The lock may include instructions for locally blocking the event messages according to the combination of event attributes that include the counted number of messages as an event attribute.

An exemplary lock is now described. Locks may be generated once a counter reaches a defined limit (i.e., the threshold). Locks may be generated per entity (e.g., process, service), which may be defined as an event attribute. Applications (i.e., processes) may synchronize on relevant locks. Applications may cache the locks and evaluate each event. Events that match the lock are rejected. Applications may automatically expire the locks based on a defined expiration. In the example, each request in column values, for the path "/board/items/*" for account_id 5 is rejected for 5 minutes (i.e., 1653391187−1653390887=300 sec), at which time the lock has expired.

```
{
    "rule_name": "workflow-board-list-limit",
    "observe": {
        "domain": "workflows",
        "app": "column-values",
        "path": "/board/items/*"
        "accout id": 5,
    }
    "lock": {
        "lock start": 1653390887,
        "lock expiry": 1653391187
    }
}
```

At 210, the processor dynamically provides the lock to the process that generated the event messages having the combination of event attributes, and/or the client terminal executing the process.

The process and/or client terminal locally implements the lock, for local blocking of the event messages having the combination of event attributes. The process may include code designed for implementing the lock for locally blocking the event messages having the certain combination of at least one event attributes.

Alternatively or additionally, the lock is provided to one or more locker-gate processes that are positioned between the processes and the services. Each locker-gate may be in a default open state, allowing all event messages to stream from the processes to the services.

Event messages that do not include the combination of event attributes defined by the lock are non-blocked by the implemented of the lock, and their streaming continues.

There may be multiple locks, for locally blocking of event messages with a common combination of event attributes, which are provided to multiple processes and/or client terminals. A synchronization between the multiple locks may be performed, by the processes that generate the event messages having the combination of event attributes, and/or multiple client terminals running the processes. The synchronization may block streaming of the event message with common combination of event attributes at the same time according to the synchronized locks, and/or the synchronization may resume the streaming of the blocked messages after the time interval defined by the locks has elapsed. The synchronization may be performed, for example, when different locks use different times such as using different internal clocks of different processes and/or different client terminals.

There may be multiple locks provided to a common process and/or common client terminal, for blocking different sets of event messages with different combinations of event attributes.

Optionally, each process and/or each client terminal to which a respective lock is sent, provides an indication to the event broker of whether the respective lock has been successfully implemented or not. When the lock includes a timer, the process and/or client terminal may provide an indication of a state change of the lock, such as when the applied lock has been lifted due to the expiration of the time interval. An event message that is blocked by the lock may trigger sending of an event message to the event broker server. The process and/or client terminal may send the event message to the event broker server indicating blocking by the lock. The lock may include instructions for sending the event message to the event broker server indicating blocking by the lock. In some cases, receipt of predetermined amounts of event massages that indicates blocked event may result with the central locker elongating the time in which the lock is applied.

Optionally, one or more of the processes that generate event messages, and which implement the lock, may be associated with an independent rate locker that blocks event messages when a rate of event messages is above a threshold, for example, a standard independent rate locker that blocks the event messages regardless of event attributes of the event messages. In such implementation, the processes is associated with both the lock and the independent rate locker.

At 212, one or more features described with reference to 202-210 are iterated, for dynamically monitoring event messages for dynamically creating locks.

Referring now back to FIG. 3, at 302, an application (i.e., process) and/or client terminal generates event messages for accessing 354 one or more services 350 hosted on server(s) 352, optionally via APIs (or other virtual interfaces).

At 304, the event messages are streamed from the application and/or client terminal.

At 306, the streamed event messages are stored in an event dataset hosted by an event broker server of a distributed event streaming technology service, for example, KAFKA®. The event broker monitors the event dataset.

At 308, the event messages in the event dataset are monitored, for example, by another server hosting a counter, and/or to a counter application running on the event broker server.

At 310, the counter counts the number of event messages for each defined combination of event attributes.

At 312, a lock that includes instructions for locally blocking the event messages having the certain combination of event attributes is dynamically generated in response to the counter number reaching a threshold. The lock is provided to the application and/or client terminal, for locally blocking the event messages having the certain combination of event attributes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant event brokers will be developed and the scope of the term event broker is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of centralized control of event messages for accessing a plurality of services by a plurality of processes that generate a plurality of event messages, comprising:
   monitoring event messages from an event broker server of a distributed event streaming technology service monitoring a central event dataset storing the plurality of event messages streamed over a network from the plurality of processes for accessing the plurality of services;
   counting a number of event messages for at least one combination of at least one event attribute according to at least one set-of-rules;
   dynamically generating a lock that includes instructions for blocking the event messages having the certain combination of at least one event attributes in response to the number reaching a threshold for a certain combination of at least one event attribute; and
   dynamically providing the lock to each process that generates event messages having the combination of at least one event attribute, wherein each process is configured for implementing the lock for locally blocking the event messages having the certain combination of at least one event attributes.

2. The computer implemented method of claim 1, wherein an event message that is blocked by the lock sends an event message to the event broker server.

3. The computer implemented method of claim 1, wherein the event messages streamed over the network from the plurality of processes to the plurality of services are non-gated by a central rate limiting application.

4. The computer implemented method of claim 1, wherein the lock is generated for blocking event messages from any one of the plurality of processes that generate event messages.

5. The computer implemented method of claim 1, wherein the lock is generated according to a set-of-rules, wherein a certain set-of-rules is selected from a plurality of sets-of-rules according to the certain combination of at least one event attribute.

6. The computer implemented method of claim 5, wherein the plurality of sets-of-rules are provided by a user and are updatable, wherein each of the plurality of sets-of-rules is customizable.

7. The computer implemented method of claim 1, wherein the number of event messages counted for each process is an event attribute, wherein the lock includes instructions for locally blocking the event messages according to the event attribute and the certain combination of at least one event attribute.

8. The computer implemented method of claim 1, wherein the plurality of event messages are generated in response to a plurality of request messages generated by the plurality of processes for accessing the plurality of services, wherein the plurality of event message are distinct from the plurality of request messages, wherein the plurality of request messages are streamed over the network from the plurality of processes to the plurality of services, the plurality of request messages are non-gated by a central rate limiting application, wherein the lock includes instructions for locally blocking streaming of the request messages.

9. The computer implemented method of claim 1, further comprising synchronizing between a plurality of locks implemented by at least one of a plurality of processes that generate the event messages having the combination of at least one event attribute, and a plurality of client terminals running the plurality of processes.

10. The computer implemented method of claim 1, wherein the at least one of: each process and each client terminal, is configured to send an event message to the event broker server indicating whether the lock is successfully implemented.

11. The computer implemented method of claim 1, further comprising a plurality of counters each with a corresponding threshold, each counter for counting the number of the event messages of a certain combination of at least one event attribute, wherein a certain lock corresponding to a certain counter is dynamically generated when the number counted by the certain counter reaches a certain corresponding threshold.

12. The computer implemented method of claim 11, further comprising analyzing the plurality of event messages to identify a plurality of combinations of at least one event attributes, and automatically generating the plurality of counters for counting event messages according to the plurality of combinations of at least one event attributes.

13. The computer implemented method of claim 1, further comprising computing a future time at which the threshold is predicted to be reached, and wherein the lock includes instructions for implementing the blocking at the future time.

14. The computer implemented method of claim 1, further comprising feeding the plurality of event messages having the combination of at least one attribute into the ML model, wherein the ML model is trained on a training dataset comprising a plurality of records, wherein a record includes a plurality of event messages having the combination of at least one attribute, and a ground truth indicating of whether the lock is to be provided or not.

15. The computer implemented method of claim 14, wherein the event dataset stores a historical record of event messages, and wherein the historical record is fed into the ML model.

16. The computer implemented method of claim 1, further comprising computing a percentage of the event messages with combination of at least one event attribute of the stream of the plurality of event messages, and dynamically generating the lock in response to the percentage reaching a percentage threshold.

17. The computer implemented method of claim 1, wherein the at least one event attribute is selected from a group comprising: source process that generated the event message, target service destination for the event message, geographical location of the source process that generated the event message, geographical location of the target service for the event messages, time of generation of the event message, user using the process that generated the event message, micro service, event type, and combination thereof.

18. The computer implemented method of claim 1, wherein the lock includes a timeframe for implementing the lock.

19. The computer implemented method of claim 1, at least one of: wherein the plurality of processes comprise a plurality of applications, wherein the plurality of processes are executed by a plurality of client terminals, wherein the plurality of applications are accessed via a plurality of virtual interfaces, wherein the plurality of virtual interfaces are implemented as application programming interfaces (APIs), wherein the plurality of services hosted by at least one server, wherein the plurality of client terminals are in network communication with the at least one server.

\* \* \* \* \*